UNITED STATES PATENT OFFICE.

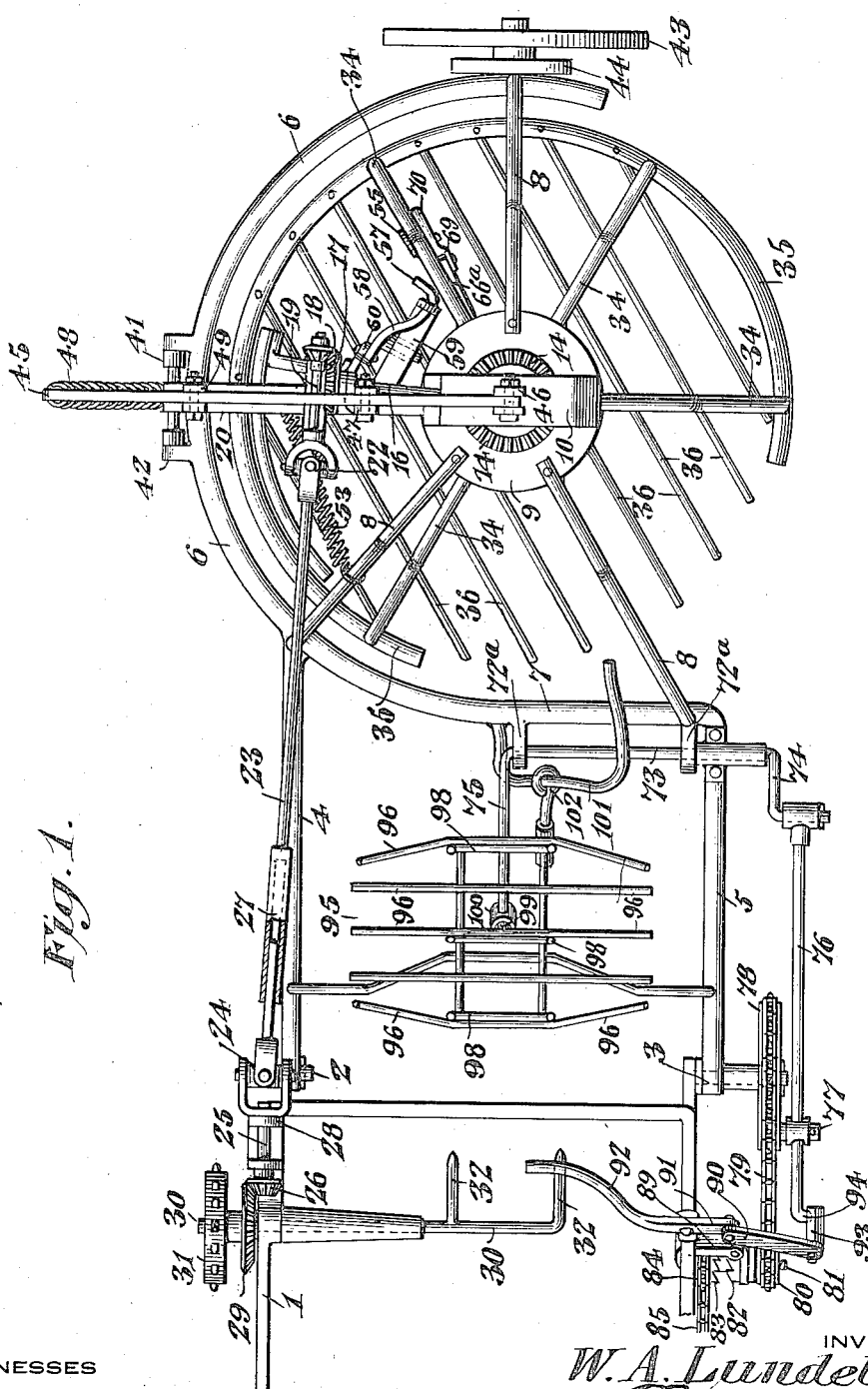

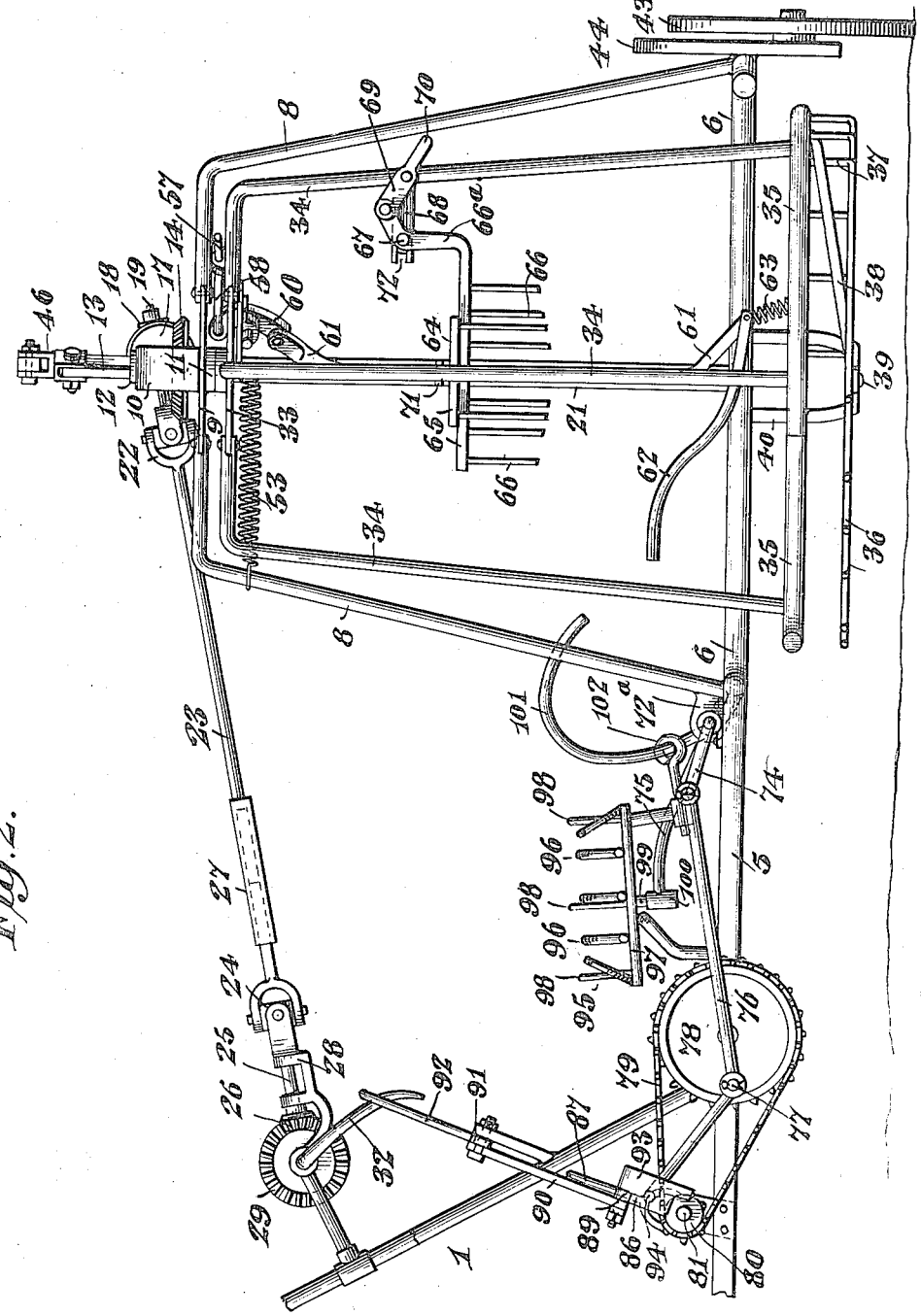

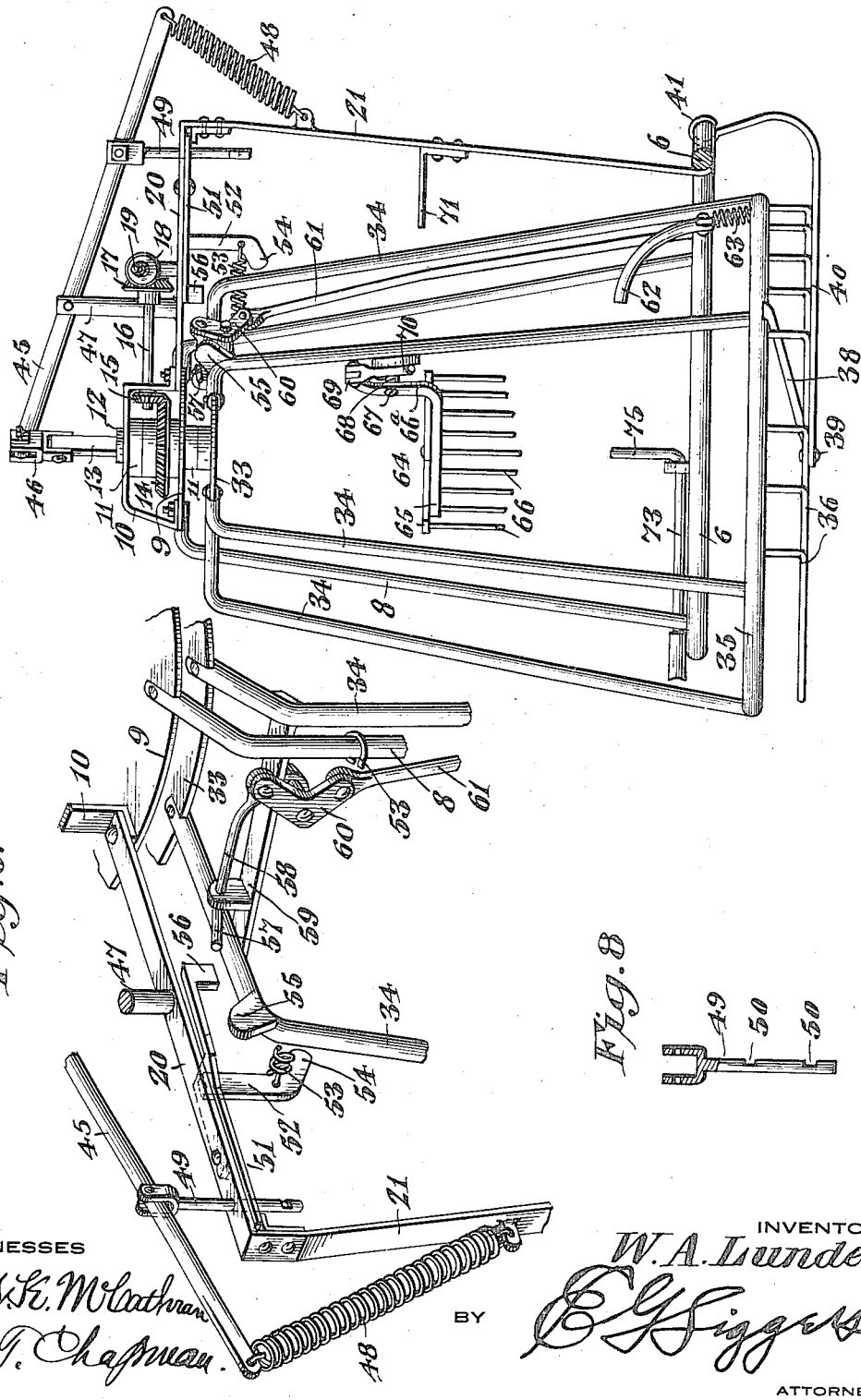

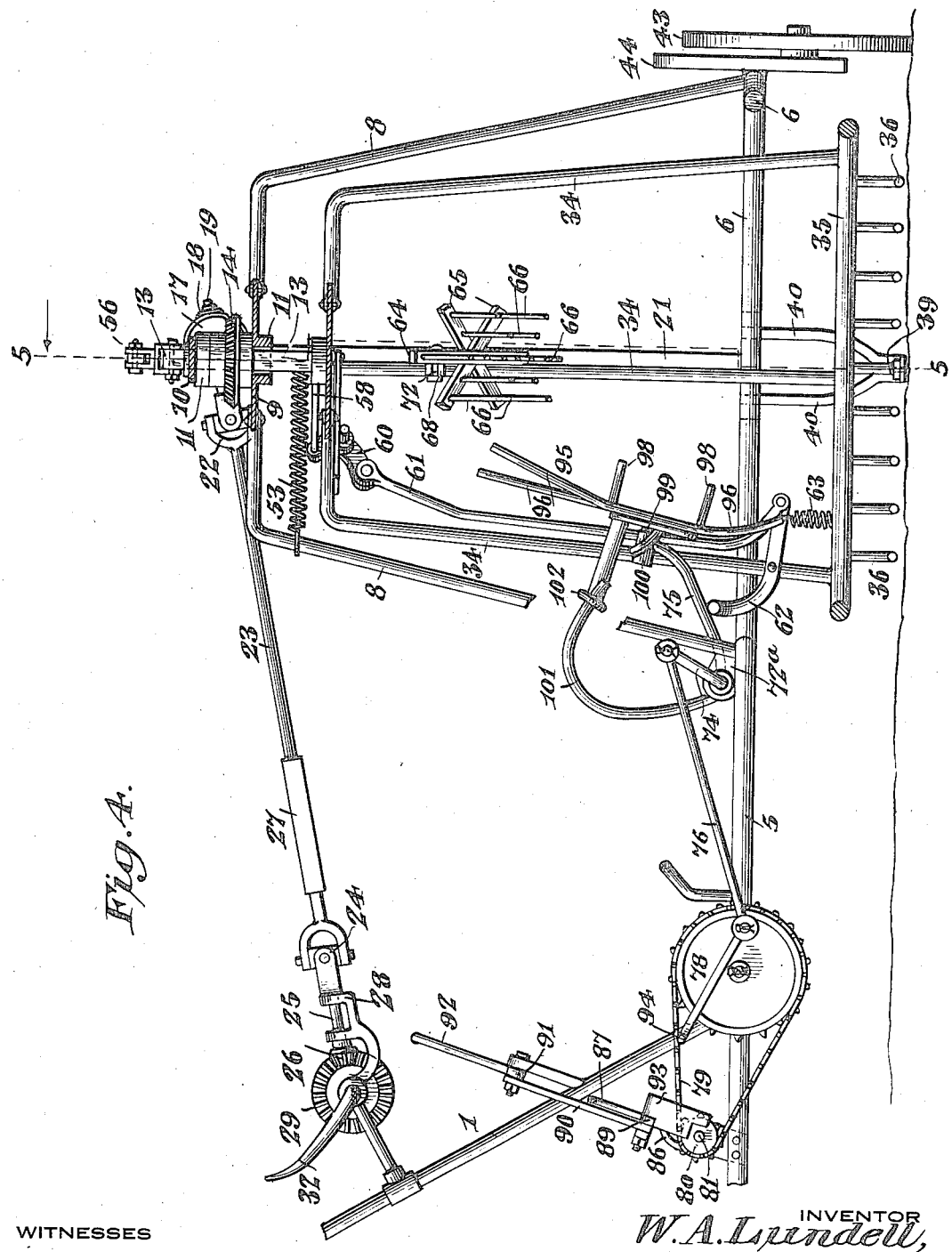

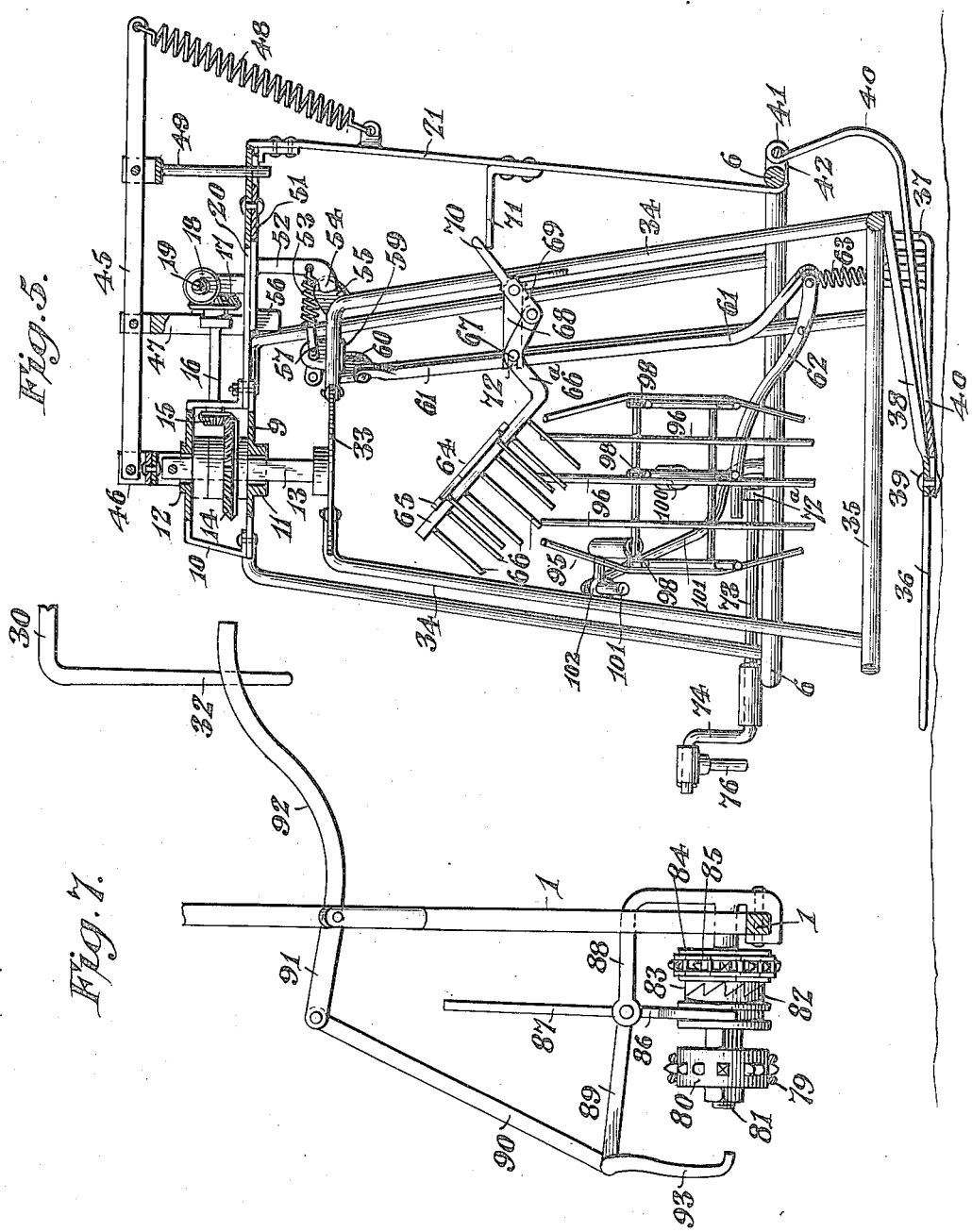

WILLIAM ALFRED LUNDELL, OF SIOUX FALLS, SOUTH DAKOTA.

GRAIN-SHOCKING MACHINE.

1,277,616.      Specification of Letters Patent.      Patented Sept. 3, 1918.

Application filed May 15, 1917. Serial No. 168,744.

*To all whom it may concern:*

Be it known that I, WILLIAM A. LUNDELL, a citizen of the United States, residing at Sioux Falls, in the county of Minnehaha and State of South Dakota, have invented a new and useful Grain-Shocking Machine, of which the following is a specification.

This invention has reference to grain shocking machines, and its object is to provide an attachment for grain harvesters, whereby the bundles of grain may be assembled in shocks in the attachment and then at intervals deposited on the ground.

The invention comprises mechanism which may be applied to standard makes of harvesters to travel with the harvester and receive a determined number of bundles as bound until the number is completed, when a holding device for the shock is automatically caused to release the shock and permit it to rest upon the ground, while the machine proceeds away from it.

The invention will be best understood from a consideration of the following detailed description, taken in connection with the accompanying drawings forming part of this specification, with the further understanding that while the drawings show a practical form of the invention the latter is not confined to any strict conformity with the showing of the drawings, but may be changed and modified so long as such changes and modifications come within the scope of the appended claims.

In the drawings:—

Figure 1 is a plan view of the shock attachment showing only a very small portion of the harvesting machine to which it is attached.

Fig. 2 is a rear elevation of the attachment.

Fig. 3 is an elevation of the attachment from the right hand side of Fig. 2 with the supporting frame in diametric section to avoid hiding certain parts, and the view omitting distant parts.

Fig. 4 is a view similar to Fig. 2 but showing some parts in elevation and other parts in diametric section, with the attachment in position to discharge a shock of bundles.

Fig. 5 is a section on the line 5—5 of Fig. 4 but omitting distant parts.

Fig. 6 is a perspective view of a portion of the upper end of the shock holding cage and supporting frame drawn on a larger scale than the other views.

Fig. 7 is a detail view of a clutch mechanism interposed in the drive between the main harvesting machine and the attachment.

Fig. 8 is a detail view of a member of a latch mechanism for holding the shock forming cage at different heights.

Referring to the drawings there is shown a small portion of the deck 1 of a harvesting machine, which showing is deemed sufficient for an understanding of the invention so far as its location with respect to the harvesting machine is concerned.

Attached by pivot connections 2, 3 to the deck portion 1 of the harvesting machine are two bars 4, 5, respectively, spaced apart in the direction of the travel of the machine. These bars at the ends remote from the pivots 2 and 3 are made fast to a basic frame member 6 of curved conformation representing in the particular showing of the drawings somewhat more than a semicircle with a portion 7 thereof between the bars 4 and 5 tangential to the curved portion. The particular shapes named are not obligatory, although preferable.

Rising from the basic frame 6 are uprights 8 forming a skeleton support and at their upper ends approaching and connected by a plate 9. The frame is open on one side for approximately half its diameter for a purpose which will hereinafter appear.

Fast to the top of the plate 9 is a yoke 10 extending diametrically thereof, and both the plate 9 and yoke 10 have journal bearings 11, 12, respectively, for an upright shaft 13 of square or other non-circular shape and traversing a bevel gear 14 between the plate and yoke, the arrangement being such that the shaft 13 while incapable of rotating in the bearings 11 and 12 may be moved lengthwise thereof, and where passing through the gear 14 fits the latter in a manner to cause the gear to rotate with the shaft.

The gear 14 is engaged by a bevel pinion 15 mounted on a shaft 16 journaled in the yoke 10 and carrying another bevel pinion 17 meshing with still another bevel pinion 18 on one end of a shaft 19 mounted on a frame member 20 carried at one end by the plate 9 and extending away therefrom. The other end of the frame member 20 is supported by an upright 21 rising from the basic member 6. The shaft 19 at the end remote from the bevel pinion 18 is connected by a universal joint 22 to another shaft 23 which at the end remote from the universal joint 22 is connected by another universal joint 24 to a shaft member 25 carrying a pinion 26. The shaft 23 includes a slip joint 27 and the shaft 25 is mounted on a bracket 28 supported by the deck frame 1.

Engaging the pinion 26 is a bevel gear wheel 29 on a shaft 30 forming part of the bundle delivery mechanism of the harvester, and on this shaft is a sprocket wheel 31 by means of which the shaft 30 is driven from other mechanism of the harvester. The shaft 30 is provided with delivery fingers 32, which, while constituting part of the harvester mechanism, are utilized for a purpose to be described.

The shaft 13 is upright and carries at its lower end a head in the form of a plate 33 or in any other suitable form, and the head 33 in turn carries a series of depending posts 34 connected at their lower ends by a bar 35 preferably, although not necessarily, of curved conformation, and defining the greater portion of a circle. The frame made up of the members 33, 34 and 35 constitutes a shock assembling frame, into which the bundles are delivered from the harvesting machine in such manner as to form a shock, wherefore the frame may be termed the shocking frame. In order to support the bundles as delivered into the frame, the curved bar 35 carries a series of fingers 36 in substantially parallel arrangement and of sufficient length and spread to form a bottom for the shocking frame. The fingers 36 are arranged somewhat below the bar 35 in the installed machine, and are supported at one end by angle portions 37 fast to the bar 35, the other ends of the fingers 36 being free and directed toward the open end of the curved basic member 35 of the shocking frame or cage.

In order to support and guide the lower end of the shocking frame or cage, there is made fast to the basic member 35 a relatively rigid arm 38 continued from that side of the basic member 35 opposite its open portion or mouth to the axis of rotation of the shocking frame as defined by the shaft 13. The arm 38 is pivoted by means of a pivot pin 39 to one end of an underriding bracket 40 having the other end laterally spread and hung by pivot connections 41 upon a bracket 42 fast to the basic member 6 of the main frame of the device. The purpose of pivoting the bracket 40 on the bracket or support 42 is to permit a limited up and down movement of the shocking frame or cage for a purpose which will hereinafter appear, this movement in the lowering direction being sufficient to permit the fingers 36 to closely approach or actually engage the ground over which the device is traveling, while in the elevated position the fingers 36 are raised a considerable distance from the ground.

In order to support that end of the frame member 6 remote from the harvesting machine so that the frame may be carried free of the ground at all times, there is provided a supporting wheel 43, and in order that the relation of the supporting wheel to the frame it supports may be varied, any suitable adjusting mechanism simply indicated at 44 without attempt at showing any detailed construction may be employed. Any one of numerous known wheel adjusting structures adapted for the purpose may be used, wherefore it is not deemed necessary to indicate such structures in detail.

The shaft 13 is carried at its upper end on one end of a lever 45 by means of a swivel and pivot hanger 46. The lever 45 is mounted on a fulcrum post 47 erected on the frame member 20. That end of the lever 45 remote from the swivel connection 46 is connected to one end of a spring 48, the other end of which is connected to the upright 21, the spring 48 being of sufficient strength to lift the shock receiving cage when empty, but will yield to the weight of the shock receiving cage when containing its load of grain bundles. The lever 45 between the spring 48 and the post 47 carries a latch pin 49 extending through and guided by the frame member 20. The pin 49 is provided at longitudinally spaced points with notches 50 for engagement by one end of a rockable latch lever 51 mounted on the frame member 20. Fast to the latch lever 51 is a depending bracket 52 to which is secured one end of a spring 53, the other end of which is made fast to some convenient point, such as one of the uprights 8, the office of the spring 53 being to hold that end of the lever 51 adjacent to the pin 49 in engagement therewith, so as to enter one or the other of the notches 50. The bracket 52 is formed with a projecting terminal portion 54 which under certain positions of the shocking cage is in the path of a projection or lug 55 on one of the posts 34, this arrangement being for a purpose which will hereinafter appear.

The latch lever 51 at the end remote from that engaging the pin 49 is formed with a projection or finger 56 which under circumstances to be described is engaged by an angle projection 57 of a rod 58 carried by a support 59 in turn carried by the shocking cage near its upper end. The rod 58 is under the control of a bell crank lever 60 in turn controlled by a rod 61 reaching to near the bottom of the shocking cage where it is pivotally connected to a lever 62 mounted on one of the uprights 34 and under the control of a spring 63, this arrangement also being for a purpose which will hereinafter appear.

The cage is further provided with a bundle spacing and supporting head 64 composed of cross arms 65 and pins 66 arranged to constitute a series of pockets into which the head ends of the bundles may lodge. The head 64 is carried by an angle lever 66ª having a pivotal support 67 in a bracket 68 carried by one of the uprights 34 of the cage. The lever 66ª is pivotally connected to one end of a rock lever 69 having its other end 70 extended so as to be engaged by a projecting bracket 71 on the support 21 when the cage is in a certain position. The bracket 68 has the end supporting the pivot 67 slotted, as indicated at 72, to compensate for the difference in angular movements of the levers 66ª and 69.

The main frame member 6 is provided with spaced journal lugs 72ª in which is mounted a rock shaft 73 having at one end a crank 74 and at the other end an angle arm 75. The crank 74 is engaged by one end of a pitman 76 journaled to a stud 77 on a sprocket wheel 78 in eccentric relation to its axis, the sprocket wheel being connected by a sprocket chain 79 to another sprocket wheel 80 mounted on a journal stud 81 carried by the frame of the binder deck 1. The stud 81 carries a slidable clutch member 82 fast to the sprocket wheel 80 and movable into and out of engagement with another clutch member 83 on the stud 81 and rotatable with and movable toward and from sprocket wheel 84 driven by a sprocket chain 85 from some moving part of the harvester. The clutch member 82 is under the control of a fork 86 on one end of a lever 87 mounted on a bracket 88 on the frame 1. The lever 87 has an arm 89 connected by a link 90 to another lever 91 mounted on the frame 1 and provided with an arm 92 in the path of one of the fingers 32. The lever arm 89 is formed with a finger 93 fast thereto in the path of a projection 94 of the pitman 76, so that at a properly timed position of the sprocket wheel 78 the clutch members 82 and 83 are separated, the finger 32 engaging the lever arm 92 and serving to couple the clutch members for rotating the sprocket wheel 78 and rocking the shaft 73.

The arm 75 carries at its outer end a bundle placer or cradle 95 made up of a series of longitudinal rods 96 and cross rods 97 with intermediate fingers 98, the arrangement being such that a bundle of grain discharged by the harvester is caught by the cradle, which then is moved from an initially horizontal position, indicated in Figs. 1 and 2, toward the shock carrier or cage. The cradle is provided with a stem 99 seated in a socket 100 on the end of the arm 75 carrying the cradle. Projecting from the frame member 7 is an appropriately curved guide bar 101 engaged by a swivel eye 102 in turn carried by the cradle 95, the arrangement being such that when the cradle is rocked from a normally horizontal position to an upright position it is given a twist in the socket 100, so that as it is rocked toward the shock carrier or cage an approximately quarter turn is imparted to it and the grain bundle, deposited in the cradle lengthwise of the travel of the machine, is delivered butt end downward on to the fingers 36 forming the bottom of the shock carrier.

In the particular arrangement shown in the drawings the shock carrier is assumed to be of a size to accommodate six bundles. When the shock carrier is in position to receive the first bundle, it is in about the position shown in Fig. 1 with the mouth of the carrier in the path of the cradle 95 which, in the position of the parts shown in Fig. 1, may be considered as having received a bundle of grain. Now, the shaft 30 being appropriately moved, a finger 32 thereon engages the lever arm 92, thereby rocking the lever 91 in a direction to cause the engagement of the clutch members 82 and 83, so that motion is imparted to the sprocket 78, and through the pitman 76 causes a rocking movement of the shaft 73 to carry the cradle 95 from the bundle receiving position toward the mouth of the shock carrier and deposit the bundle in an upright position in the carrier. The rotation of the sprocket 78 continues and the parts are so proportioned that by the time the cradle has deposited the bundle into the carrier the stud 77 has completed half its rotation about the axis of the wheel 78 and begins its return movement toward the first position thus rocking the shaft 73 and returning the cradle to its first position, at which point the extension 94 engages the finger 93 and throws the clutch member 82 away from the clutch member 83, with the result that further rotation of the sprocket 78 is stopped. In the meantime the shaft 30 is rotated imparting a slow rotative movement to the shock carrier or cage, and the cage is moved an appropriate distance, which under the conditions assumed is one-sixth of a revolution, by which time another bundle has been deposited in the cradle 95, and the latter has been moved to the discharge position, so that the second bundle is deposited in the shock carrier or cage alongside of the first one.

The operations continue as stated until the sixth position of the shock carrier or cage is reached.

During the rotation of the shock receiving cage the head 64 is in the lowered position, that is, so as to be engaged by the head ends of the bundles deposited in the cage. Furthermore, the cage is in the elevated position being there held by the latch pin 49 with the upper one of its notches 50 engaged by the latch lever 51, this being the normal position of the cage under the influence of the spring 48. When the sixth position is reached, the mouth of the cage is rearward with relation to the direction of travel of the machine, and in this position the lever 62 at the end remote from the spring 63 is in the path of the arm 75 carrying the cradle, wherefore when the cradle is moved to the upright or discharge position, the arm 75 engages the lever 62 and rocks it, thus expanding the spring 63 and moving the link 61 in a direction to propel the rod 58 toward the lug 56 which is then close to the angle end 57 of the rod 58. This results in a rocking of the latch lever 51 to an extent releasing the rod or stem 49, whereupon the weight of the six bundles of grain deposited in the cage is sufficient to overcome the spring 48 and cause the cage to drop, the parts being so proportioned that in this position the fingers 36 rest upon or in very close relation to the ground and are disposed lengthwise of the line of travel. This dropping movement of the cage brings the lug 55 low enough so that the extension 54 of the lever 51 is in its path, and at the same time the end 70 of the lever 69 reaches the bracket 71 and the lever 69 is rocked, thus correspondingly rocking the lever 66 and raising the head 64 out of the path of the assembled heads of the grain bundles, which heads have dropped, so as to then clear the head 64 in its raised position. The butt ends of the upstanding assembled bundles of grain in the shock cage or carrier engage the ground and as the harvester and the shock assembling device continue the forward movement, the cage moves from the shock, thus leaving it standing in the field, and the cage is therefore emptied of the assembled bundles. In the meantime the cradle is returned to its normal position, thus releasing the lever 62, which is returned to its normal position by the spring 63, but the end 57 of the rod 58 has passed beyond the lug 56 and so no longer affects it, the lever 51 remaining in engagement with the pin or stem 49 by raising of the spring 53 and the cage remains locked in its lowered position against the tendency of the spring 48 to raise it. However, in the lowered position the lug 54 is in the path of the lug 55, so that the continued rotative movement of the cage causes an engagement of these parts, whereupon the lever 51 is again rocked to release the stem or pin 49 and since the spring 48 is able to overcome the weight of the cage alone, the cage on release from its latched position is raised to its higher position to be again locked by the lever 51 engaging an appropriate notch 50 and the lug 55 being higher than the lug or extension 54 is not engaged by the extension 54, so that the rotation of the cage may proceed without interference. When the cage rises the head 64 falls to its normal position, since the arm 70 of the lever 69 is carried above the bracket 71 and the weight of the head 64 causes it to assume its first position where it is held by the engagement of the pin 67 in the closed end of the slot 72 of the bracket 68.

The parts are so proportioned and timed in action that a predetermined number of bundles as received one at a time from the harvesting machine is collected in the shock carrier or cage and formed into a shock, and when the shock is completed the cage is lowered and the shock is swept out of the cage by the forward travel of the machine by the butt ends of the bundles engaging the ground, whereupon the shock forming cage being received from the weight of the accumulated bundles rises to its first position and another assemblage of bundles into a shock proceeds.

What is claimed is:—

1. A grain shocking machine provided with an upright frame fast to the machine and open at one side, an upright cage within the first-named frame and rotatable therein about an upright axis and having one side open to be brought into coincidence with the open side of the upright frame once during each rotation of the cage, and means for causing the cage to move up and down in the upright frame, the down movement occurring when the open sides of the cage and frame coincide.

2. A grain shocking machine provided with an upright frame fast to the machine and open at one side, an upright cage within the frame and rotatable therein about an upright axis and having one side open to be brought into coincidence with the open side of the frame once during each rotation of the cage, and means for causing the cage to move up and down in the frame, the down movement occurring when the open sides of the cage and frame coincide, said cage having a bottom formed of parallel fingers, leading to and terminating at the open side of the cage, whereby grain bundles standing in the cage will be engaged by the ground and dragged from the cage when the latter is in the lowered position.

3. In a grain shocking machine, an upright frame fast to the machine and open at one side, an upright cage within the frame and rotatable therein about an upright axis and also open along one side, said cage constituting a shock-forming bundle receptacle, means imparting to the cage a normal tendency to rise, means for holding the cage in the raised position while being loaded, and means for releasing the cage when its open side coincides with that of the frame to gravitate to a low position.

4. A grain shocking machine having an upright frame fast to the machine, a cage within and suspended from the fixed frame, said cage constituting a shock-forming bundle receptacle and having one side open, and also being provided with a receiving and bundle-sustaining bottom formed of parallel fingers each supported at one end by the cage and at the other end directed toward the open side of the cage, and means for imparting rotative movement to the cage about an upright axis through the suspension means for said cage.

5. In a grain shocking machine, an upright shock-forming bundle receptacle with one side open and having a bundle-supporting bottom formed of a series of parallel fingers each supported at one end by the receptacle and at the other end directed toward the open side of the receptacle, axially located suspension means for the receptacle, means for rotating the suspension means about its longitudinal axis to cause rotation of the receptacle about an upright axis, and means for causing up and down movements of the receptacle with the lowering movement timed to bring the receptacle close to the ground when the fingers are in the line of travel of the machine with the open side of the receptacle rearmost.

6. In a grain shocking machine, a shock forming bundle receptacle in the form of an upright cage open on one side, and mounted for rotation about an upright axis, said cage having one side open, with the upright portion of the cage formed of a series of upright bars spaced apart about the cage by distances permitting the deposition of bundles of grain in the cage through the spaces between the upright bars, and said cage having a bottom for receiving the bundles of grain with the latter upright, said bottom being formed of parallel fingers directed toward and terminating at the open side of the cage.

7. A grain shocking machine provided with an upright receptacle for bundles of grain for assembling them into a shock, said receptacle being rotatable about an upright axis and provided with a skeleton bottom portion for receiving and supporting the bundles of grain deposited in the receptacle, and also mounted for up and down movement, means for imparting to the receptacle a normal tendency to move to the elevated position and yieldable to the weight of bundles assembled into a shock to lower into contiguous relation to the ground over which the machine travels, means for locking the receptacle in the elevated position, means for locking the receptacle in the lowered position, and means for unlocking the receptacle when in the elevated position with its quota of bundles completed and with the receptacle in position to discharge the shock by engagement of the latter through the skeleton bottom with the ground over which the machine is traveling.

8. In a grain shocking machine, a rotatable receptacle for receiving and sustaining bundles of grain, means for feeding bundles of grain to the receptacle comprising a bundle-receiving cradle having a normal position of extension in the direction of travel of the machine, and means for lifting and at the same time turning the cradle to deposit bundles in an upright position in the receptacle.

9. In a grain shocking machine, a shock-forming bundle receptacle comprising an upright cage rotatable about an upright axis and provided with a bottom marginal bar having its ends spaced apart to provide a discharge opening at one side of the cage, and upright bars rising from the bottom marginal bar and spaced apart to receive bundles of grain between them, and a bundle-supporting bottom for the cage comprising a series of parallel fingers each carried at one end by the bottom marginal bar and having the other end directed toward the space between the ends of said bottom marginal bar.

10. In a grain shocking machine, a shock-forming bundle-receiving cage rotatable about an upright axis and movable up and down, and having a bundle-receiving and supporting bottom formed of parallel fingers, the cage being opened on one side with the fingers directed toward said open side, means for positively holding the cage in the elevated position, and means for releasing the cage to gravitate to the lower position and timed to operate when the fingers are in the line of travel with the open side of the cage rearmost.

11. A grain shocking machine provided with an upright cage open at one side and provided with a bottom formed of parallel fingers directed toward the open side, said cage being mounted to move up and down and rotate about an upright axis, latch means for holding the cage in the elevated position while being loaded with bundles of grain to assemble them into a shock, and means for locking the cage in the lowered position while the formed shock is being discharged therefrom.

12. A grain shocking machine provided with a rotatable receptacle having one side open and with a bottom for sustaining bundles of grain, said bottom discharging at the open side of the receptacle, and said receptacle having a range of up and down movement to bring the bottom into the lower position contiguous with the ground over which the machine travels, means imparting to the empty receptacle a tendency when lowered to rise to the higher position with the tendency superior to the weight of the receptacle and inferior to the weight of the receptacle when loaded, means for temporarily locking the receptacle in the elevated position against the lowering action of the accumulated grain bundles, and means for releasing the receptacle when containing its quota of bundles to drop to the lower position under the weight of the accumulated bundles, said machine being also provided with a bundle receiving cradle having a normal position of extension in the direction of the travel of the machine, means for lifting and turning the cradle to deposit bundles in an upright position in the receptacle, and means responsive to the movement of the cradle on depositing the last bundle of the quota necessary to fill the cradle for releasing the cradle to drop to the lowered position.

13. In a grain shocking machine, an upright bundle-receiving cage rotatable about an upright axis, a reciprocatory cradle associated with the cage, said cradle having a range of movement from a substantially horizontal position in which it is disposed in the line of travel of the machine to a substantially upright position of discharge into the cage, and means for turning the cradle during its movement from one position to the other to discharge a received bundle into the cage butt end downward.

14. In a grain shocking machine, an upright cage, a cradle for receiving bundles of grain and movable from a substantially horizontal position to a substantially upright position, and in the latter position discharging a received bundle into the cage, and means for imparting a quarter twist to the cradle during its movement from the horizontal to the upright position.

15. In a grain shocking machine, an upright cage for receiving bundles of grain to form a shock, said cage being rotatable about an upright axis, and means for depositing bundles of grain butt end downward into said cage, comprising a cradle having a range of movement from a substantially horizontal bundle-receiving position in the line of travel of the machine to a substantially upright position to discharge the received bundle butt end downward into the cage, and means for imparting to the cradle a substantially quarter twist in its movement from one position to the other.

16. In a grain shocking machine, an upright cage for receiving bundles of grain to form a shock, and a bundle spacing and supporting head carried by the cage within the latter and rockable on a substantially horizontal axis.

17. In a grain shocking machine, an upright bundle-receiving cage rotatable about a substantially upright axis, said cage also being movable up and down, a bundle spacing and supporting head carried by the cage and movable about a substantial horizontal axis, and means for rocking the head when the cage is moved toward its lowered position.

18. In a grain shocking machine, a rotatable upright bundle-receiving cage having its axis of rotation upright and said edge being movable up and down, a bundle spacing and supporting head within the cage pivotally supported therein to rock about a substantially horizontal axis, and means on a fixed portion of the machine for rocking said head out of the path of deposited bundles when the cage is moved toward the lowered position.

19. In a grain shocking machine, a rotatable upright bundle-receiving cage having its axis of rotation upright and said cage being movable up and down, a bundle spacing and supporting head within the cage pivotally supported therein to rock about a substantially horizontal axis and means on a fixed portion of the machine for rocking said head out of the path of deposited bundles when the cage is moved toward the lowered position, said head comprising crossed arms and pins carried thereby.

20. A grain shocking machine, comprising a main frame, an upright rotatable receptacle mounted therein and movable up and down in the main frame, a support for the receptacle having a normal tendency to maintain it in the upper position and responsive to the weight of accumulated bundles in the receptacle to move to the lower position, lock means for holding the receptacle in either the elevated or lowered position, means for depositing bundles one at a time in the receptacle, means responsive to the bundle depositing means and carried by the receptacle for releasing the receptacle to movement to its lower position at a predetermined point in the rotation of the receptacle, means on the receptacle for releasing the latter when in its lowermost position and after discharging the load of bundles thereon to rise to its upper position, means for rotating the receptacle, and means for causing the actuation of the bundle depositing means in timed relation.

21. A grain shocking machine, comprising a main frame, an upright rotatable receptacle mounted therein and movable up and down in the main frame, a support for the receptacle having a normal tendency to maintain it in the upper position and responsive to the weight of accumulated bundles in the receptacle to move to the lower position, lock means for holding the receptacle in either the elevated or lowered position, means for depositing bundles one at a time in the receptacle, means responsive to the bundle depositing means and carried by the receptacle for releasing the receptacle to movement to its lower position at a predetermined point in the rotation of the receptacle, means on the receptacle for releasing the latter when in its lowermost position and after discharging the load of bundles thereon to rise to its upper position, means for rotating the receptacle, and means for causing the actuation of the bundle depositing means in timed relation, the receptacle also being provided with a bundle positioning head and said receptacle and a portion of the main frame having means for moving the positioning head out of engagement with the bundles when the receptacle is in its lowered position.

In testimony that I claim the foregoing as my own I have hereto affixed my signature in the presence of two witnesses.

WILLIAM ALFRED LUNDELL.

Witnesses:
   B. M. GETTY,
   W. H. ABERLE.